March 4, 1947. C. B. FRANCIS 2,416,744
PROCESS FOR THE UTILIZATION OF FERROUS SULPHATE SOLUTIONS
IN THE MANUFACTURE OF OTHER SULPHATES
Filed April 9, 1943 4 Sheets-Sheet 4

INVENTOR:
CHARLES B. FRANCIS,
BY
ATTORNEY

Patented Mar. 4, 1947

2,416,744

UNITED STATES PATENT OFFICE 2,416,744

PROCESS FOR THE UTILIZATION OF FERROUS SULPHATE SOLUTIONS IN THE MANUFACTURE OF OTHER SULPHATES

Charles B. Francis, Pittsburgh, Pa.

Application April 9, 1943, Serial No. 482,460

7 Claims. (Cl. 23—119)

The invention relates to the manufacture of sulphates, such as ammonium sulphate, from ferrous sulphate. It relates more particularly to a process for utilizing spent pickling acid and crude gas or cokeworks ammonia to produce either commercially pure ammonium sulphate and ferric hydroxide or commercially pure ferric ammonium sulphate.

Spent pickling acid is produced in the cleaning or pickling with sulphuric acid of steel articles, such as sheets and wire, that are to be cold formed or coated with another metal, and represents a crude solution, heretofore considered as a waste product from steel plants, containing 2% to 7% free sulphuric acid and 10% to 30% ferrous sulphate as principal ingredients and, in addition, smaller proportions of insoluble substances consisting of organic matter, traces of ferric sulphate and the salts of various metals, such as manganese, that were alloyed with the steels pickled.

Likewise, crude aqua ammonia as obtained from the ammonia stills of by-product coke and gasworks represents a complex solution of various ammonium compounds as the principal constituents, mainly ammonium hydroxide and ammonium carbonate with smaller percentages of ammonium sulphides and cyanides and numerous organic compounds in smaller proportions.

The crude aqua ammonia I prefer in the operation of my process contains from 15% to 25% total ammonia, expressed as percent $NH_3$ by weight.

Because the iron in the spent pickling acid is in the ferrous condition and the crude aqua ammonia contains acid radicals which form soluble compounds with ferrous iron, all of the latter cannot be precipitated and separated by adding ammonia to the spent acid directly, nor can other bases be used to accomplish this object. If the ferrous sulphate in the spent acid is oxidized to ferric sulphate, however, all the iron is readily precipitated by ammonia and several other bases, giving ferric hydroxide, which is insoluble and can be separated from the solution of sulphate containing the metal substituted for iron. Of the many known ways of oxidizing ferrous sulphate in solution, all of them are too costly to be commercially applicable to the treatment of spent pickling acid for the production of ammonium sulphate. However, in studying these methods, I have found that the known process of oxidizing ferrous sulphate with sulphur dioxide and air may be modified to make it practicable for the commercial utilization of spent pickling acid in the manufacture of other sulphates, particularly ammonium sulphate from crude cokeworks ammonia and to produce, in addition, a ferric hydroxide that may be applied to many purposes. Other bases which may be substituted for ammonia include the hydroxides or oxides of titanium, lithium, potassium, sodium, magnesium, uranium, aluminum, manganese, zinc, cadmium, cobalt and nickel.

However, in the following description of my process, I shall employ crude cokeworks ammonia as an example of the bases which may be used. Moreover, the utilization of spent pickling acid for the manufacture of ammonium sulphate has been one of the chief objects of my invention. A third discovery I have made, which greatly facilitates the carrying out of my process on a large scale, concerns a method, which I shall describe in detail later, of controlling the character of the ferric hydroxide precipitate formed, making it easier to filter and wash.

In experimenting with this method of oxidizing ferrous sulphate solutions a fourth discovery I have made is that sulphites, such as ammonium sulphite or ammonium bisulphite, may be substituted for the sulphur dioxide, if added to the ferrous sulphate solution gradually at a rate that will not lower the hydrogen ion concentration of the solution below pH-5. The sulphites are added, most conveniently in the form of concentrated solutions, the only requirement being that the sulphite used must contain the base of the sulphate desired.

Thus, with a supply of a given base and by slight modification in my process and some omissions or additions of equipment, I may start with acid or neutral solutions of ferrous sulphate, oxidize the ferrous sulphate to ferric sulphate by the use of sulphur dioxide or sulphites and air to produce either ferric alum or a sulphate of the given base and ferric hydroxide. As the use of spent pickling acid and crude cokeworks ammonia to produce ammonium sulphate is the chief object of the invention, I shall first describe in detail how I accomplish this object by the use of sulphur dioxide and air to oxidize the ferrous sulphate.

By the known process of oxidizing ferrous sulphate in solution with sulphur dioxide and air, the two reactions following take place simultaneously as soon as a certain proportion of the ferrous sulphate has been oxidized to ferric sulphate, the latter apparently acting as a catalyst to both reactions:

1. $2FeSO_4 + SO_2O_2 \rightarrow Fe_2(SO_4)_3 + 132$ Cals.

2. $2SO_2 + 2H_2O + O_2 \rightarrow 2H_2SO_4 + 113.3$ Cals.

In the presence either of much free sulphuric acid, say 4% or more, or in the presence of small percentages of manganese sulphate, which also acts as a catalyst in Reaction 2, Reaction 1 progresses very slowly, so that this method for oxidizing iron cannot be commercially applied directly to the spent pickling acid for oxidation of the ferrous sulphate it contains. I have found, however, that if the free acid in the spent pickling solution is neutralized with ammonia or certain ammonium compounds, such as ammonium carbonate or sulphite, that react with sulphuric acid to give a gaseous product, Reaction 1 progresses to the complete oxidation of the iron. I have further discovered that the crude aqua ammonia obtained in the coking of coal and the manufacture of coal gases, or the vapors as they come from the ammonia stills regularly employed in the by-product coke industry, may be used for the purpose of neutralizing the free acid and precipitating the iron and other metals in the spent acid that may be separated by hydrolysis. Again, in applying the known method to the oxidation of ferrous sulphate in spent pickling acids, Reaction 1 progresses only to the oxidation of about half the iron in strong solutions containing 15% or more ferrous sulphate, when Reaction 2 begins forming free acid which may again retard or halt entirely the progress of Reaction 1, and this defect I have found is also overcome by adding ammonia in proportion to the acid formed.

Again, as the proportion of ferric sulphate increases and Reaction 2 is catalyzed, there is danger, particularly if the sulphur dioxide ($SO_2$) is fed into the solution too fast, for Reaction 3 to occur—

3. $Fe_2(SO_4)_3 + SO_2 + 2H_2O \rightarrow$
$2FeSO_4 + 2H_2SO_4 + 279$ Cals.

This reaction, in which the $SO_2$ acts as a reducing agent, is well known and frequently employed, particularly in analytical chemistry. I have found that if ammonia is introduced under proper conditions into the oxidation cell, that is, the chamber in which the oxidation of the ferrous sulphate is being carried out, the acid formed by Reaction 2 may be kept neutralized and Reaction 3 prevented from occurring, except when the $SO_2$ is fed at a rate out of proportion to the available oxygen as required by Reactions 1 and 2.

All three of these reactions are exothermic and progress most rapidly at a temperature between 50° and 60° C. Consequently, the oxidation of the ferrous sulphate is slow at the beginning, and enough heat is generated in the solution to heat it to the optimum temperature.

I have also found that ammonia may be used to accomplish another object with advantage to the process, explained as follows:

During the operation of an oxidation cell for the oxidation of a given amount of a solution of ferrous sulphate, a certain small proportion, varying from 1 to 5%, of the $SO_2$ escapes, particularly at the beginning of the process when the proportion of ferric sulphate is low. The loss of this $SO_2$ is prevented by scrubbing the air escaping from the cell with a dilute solution of ammonia or a more concentrated solution of ammonium sulphite containing a little ammonia. The resultant solution of ammonium sulphite may be added to the solution in the oxidation cell where the ammonium sulphite may react with the ferric sulphate to form ammonium sulphate, ferrous sulphate and sulphuric acid according to Reaction 4.

4. $Fe_2(SO_4)_3 + (NH_4)_2SO_3 + H_2O \rightarrow$
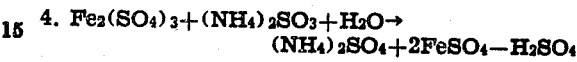
$(NH_4)_2SO_4 + 2FeSO_4 - H_2SO_4$ If free sulphuric acid is present, the ammonium sulphite reacts with it to form ammonium sulphate and $SO_2$ according to Reaction 5—

5. $H_2SO_4 + (NH_4)_2SO_3 \rightarrow (NH_4)_2SO_4 + SO_2 + H_2O$
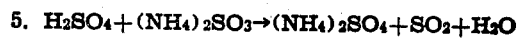

With an excess of diffused air fed to the oxidation cell, the ferrous sulphate and sulphur dioxide formed by Reactions 4 and 5 respectively are immediately oxidized in accordance with Reactions 1 and 2.

After as much as 99% or more of the ferrous sulphate in the spent pickling acid has been oxidized as described above, the oxidized solution is drawn out of the oxidation cell and transferred to another vessel where it is treated with more ammonia to precipitate the iron in accordance with the following Reaction 6—

6. $Fe_2(SO_4)_3 + 6NH_4OH \rightarrow$
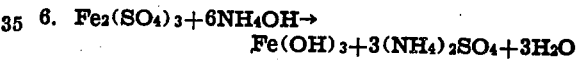
$Fe(OH)_3 + 3(NH_4)_2SO_4 + 3H_2O$ The completeness of the oxidation of the ferrous sulphate depends largely upon the purity of the ammonia available. With pure ammonia, I prefer to oxidize 100% of the iron, but as complete oxidation of the iron requires additional time out of proportion to the iron oxidized earlier in the process and crude ammonia contains substances that reduce ferric sulphate, I prefer to leave some unoxidized iron in the solution before adding crude ammonia to precipitate the iron.

Crude ammonia contains, besides other impurities, sulphides and cyanides which reduce ferric sulphates. The sulphides react with ferrous and ferric sulphates as follows:

7. $Fe_2(SO_4)_3 + 3(NH_4)_2S \rightarrow 3(NH_4)_2SO_4 + \begin{matrix} Fe_2S_3 \\ \text{or} \\ 2FeS + S \end{matrix}$
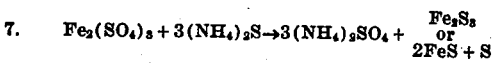

8. $FeSO_4 + (NH_4)_2S \rightarrow (NH_4)_2SO_4 + FeS$
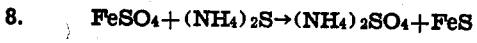

As is indicated by Reaction 7, ammonium sulphide in reacting with ferric sulphate may, under certain circumstances, give free sulphur, which may cause trouble by remaining in colloidal solution or by reacting with cyanide to form sulphocyanides (thiocyanates) which, in turn, react with ferric sulphate to form soluble iron compounds. With some ferrous sulphate present the cyanides react with the ferrous and ferric sulphates to form insoluble cyanides and the free sulphur formed in Reaction 7 is less troublesome because at least part of it may be entrapped by the ferric hydroxide and separated with the latter upon filtering.

In my process the ammonium carbonate $(NH_4)_2CO_3$ contained in the crude aqua ammonia serves a purpose similar to ammonium hydroxide, because the conditions are such that the carbonate is decomposed, forming ammonium sulphate and carbon dioxide, which being a gas, is carried out of the solutions with the other gases or forced out by heat.

Having thus explained my discoveries relating to the steps of neutralizing the free acid and of oxidizing the ferrous sulphate with sulphur dioxide and air, I shall explain my third discovery which has to do with the control of the nature of the precipitate obtained in the third step of my process for the utilization of ferrous sulphate in the manufacture of other sulphates.

In carrying out the process of treating spent pickling acid for the production of ammonium sulphate following the oxidation by the method described above, I have found that the gelatinous precipitate formed by adding ammonia to the oxidized solution in the usual manner is extremely difficult to filter, and have discovered that the character of this precipitate may be altered by controlling the conditions under which the precipitation is made. These different forms of ferric hydroxide are described as follows:

a. A reddish brown gelatinous form that occludes a great deal of ammonium sulphate and is extremely difficult to filter and wash free of the salt.

b. A very finely divided almost colloidal form that does not occlude salt but is not filtrable.

c. A red flocculent precipitate, which occludes little salt but is very bulky, does not settle, and is difficult to filter and wash in large quantities.

d. A reddish brown floc similar to type c.

e. A yellowish type obtained under conditions of low temperature and high hydrogen ion concentration, by adding the ammonia very slowly and at a rate corresponding to the rate of precipitating the iron.

f. A dense intensely red form that settles rapidly, does not occlude ammonium salt, and has a comparatively large particle size so that it may be filtered and washed rapidly without the addition of a filtering aid.

The desirable type f, I have found, may be formed either directly or by a treatment which causes precipitates of types c or d to undergo a transformation resulting in a dense granular precipitate that resembles a hydrated ferric oxide more than the familiar forms of ferric hydrate.

While this process lends itself best to batch type operation, it can be adapted to continuous methods, provided the conditions outlined below are met. As an example, the batch method of forming the dense red precipitate is described as follows:

After the ferrous sulphate has been oxidized, it is discharged from the oxidizing cell to a precipitating tank equipped with a stirring device and with suitable means for maintaining the temperature of the solution at about 70° C. Just before I transfer the oxidized solution, I introduce aqua ammonia into this tank in an amount which will be sufficient to precipitate approximately all the iron in a given batch, aiming for a slight excess rather than a shortage. While the oxidized solution is flowing into this tank, I start the stirrer, which is operated with a motor, and admit the solution from the oxidizing cell as rapidly as it will flow through the line—which should be of a size to admit the entire batch in 5 to 6 minutes, even for batches of 4000 to 5000 gallons.

It is an object of the procedure to effect the precipitation at a temperature between 70° C. and 80° C., preferably near 75° C. Since the temperature of the batch in the oxidizing cell rises to about 56° C., because of the exothermic nature of the previously stated reaction, and the reaction between the ferric sulphate and ammonia in the precipitating tank is also exothermic, the temperature of the mixture in the latter rises about 20° C. for solutions containing 15% to 20% (150 to 200 grams per liter) of ferric sulphate, so that it is not necessary to heat the solution, particularly if the precipitating vessel is properly insulated.

After adding the oxidized solution to the ammonia I continue the stirring vigorously, adding additional ammonia, if necessary, to adjust the hydrogen ion concentration of the solution to between pH-5 and pH-6, or if it is desired to precipitate the manganese which may be present, to a concentration of about pH-10. With a pH meter this determination is made in 2 or 3 minutes by filtering a small sample of the mixture and testing the filtrate. With the temperature of the mixture maintained just above 70° C., I continue the stirring until a small sample transferred to a glass cylinder indicates a precipitate having quick settling characteristics. Unless discolored from impurities in the ammonia, the precipitate has a bright red or orange red color and will settle to a depth of 3 to 4 inches in 15 minutes in a glass cylinder 8 inches high and 1 to 2 inches in diameter, leaving a clear supernatent liquid above it.

As soon as these tests show the precipitate has the desired characteristics, usually in less than 20 minutes, the stirring is stopped and the precipitate is permitted to settle for about 4 hours while another batch is being oxidized, the oxidation requiring, usually 6 to 8 hours. At the end of the settling period, the clear supernatant solution is decanted to another tank, and the sludge in the bottom, amounting to about 30% of the total mixture, as I have operated the process, is pumped into a filter press, where the insoluble matter is filtered out and the filtrate combined with the decanted liquid. The filtering operation usually requires 1½ to 2 hours to build up a cake 1 inch thick in a pressure type filter press, so that it is easy to design and plan equipment to carry out all steps of the process according to a timed sequence, and no one operation acts to delay the other.

The excess ammonia, if any is present in the clear solution of ammonium sulphate, is neutralized with sulphuric acid, and the solution is evaporated to a saturated solution in a suitable multiple effect evaporator. In treating spent pickling acid, a little ferrous iron may be gathered during the evaporation and some compounds held in solution may be salted out. If so, the solution is treated with diffused air, if necessary, and sufficient ammonia to decrease the hydrogen ion concentration to pH-6, when the solution is clarified by filtering or centrifuging. As a final operation, the clear saturated solution of ammonium sulphate is treated by one of several known methods to recover ammonium sulphate in crystalline form.

To clarify the description of the various phases of my invention there is attached flow sheets for each of several modifications of my invention. In these drawings.

For purposes of illustration, the assumption is made that I desire to produce ammonium sulphate with the understanding that any other strong base may be used instead of ammonia.

Figure 1:
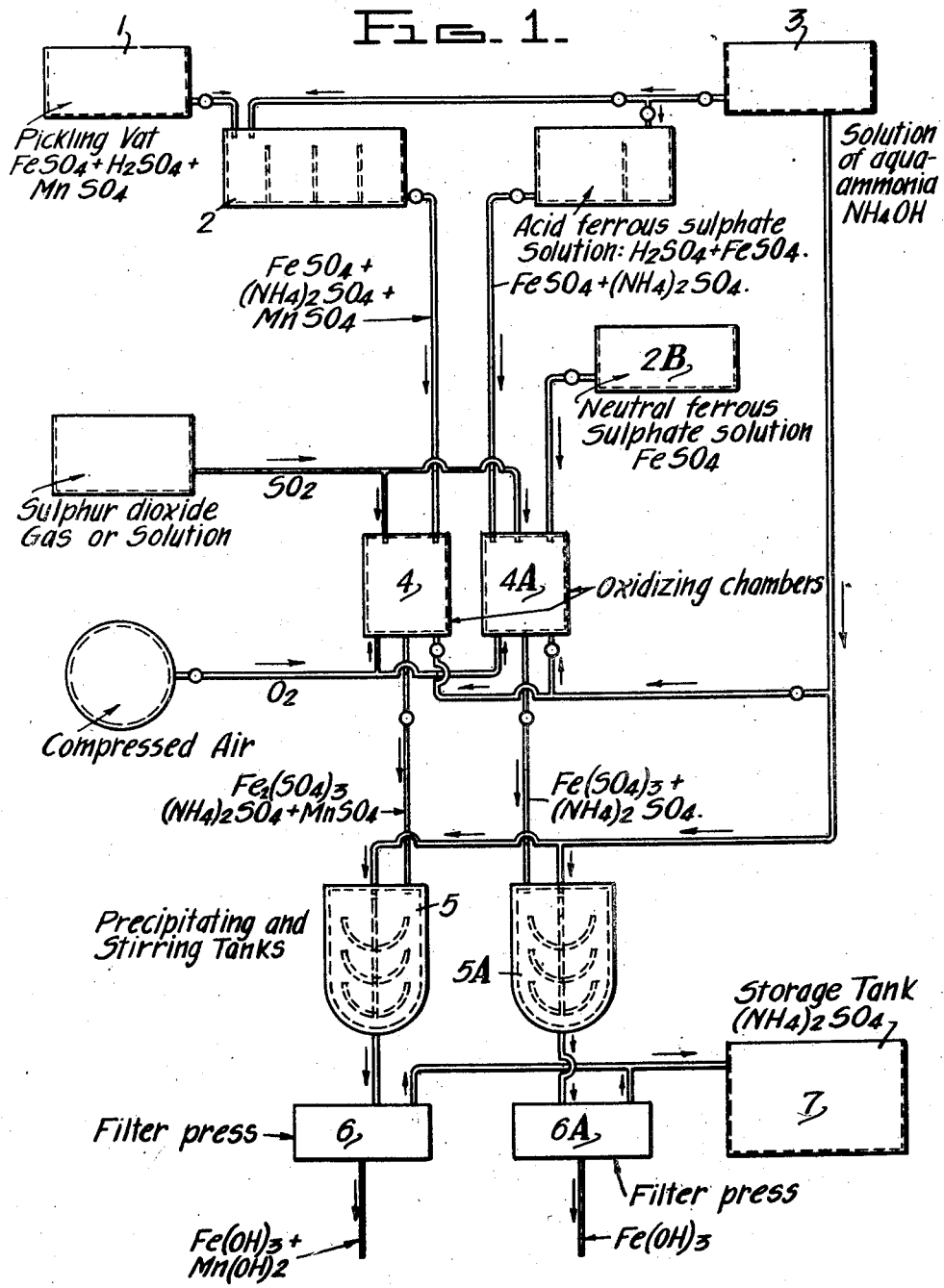
Figure 1 is a flow sheet illustrating the phase of my invention described above in which either neutral or acid solutions of ferrous sulphate or spent pickling acid are neutralized, if necessary, oxidized with sulphur dioxide and air, the iron precipitate and a saleable sulphate recovered, virtually as described above.

In the flow sheet of Figure 1, the reference numeral 1 is a pickling vat representing a source of spent pickling acids. From this vat, the spent pickling acid is drawn off at intervals into the combination storage, neutralizing and filtering tank 2. As the spent acid flows into this tank, I introduce sufficient ammonia to neutralize the free acid, not only to assist in the next step but also to render the solution less corrosive. To mix the solution and to remove insoluble matter this tank 2 is provided with compartments as shown; the last compartment being separated from the preceding one by a vertical filter of woven glass. In tank 2—A for use with other acid solutions of ferrous sulphate, only the neutralizing compartment may be provided, as shown. Tank 2—B is provided for clean neutral solutions of ferrous sulphate and is constructed without compartments.

From these tanks the solutions are admitted, continuously or at intervals, to the oxidizing cells or tanks 4 and 4—A. For continuous operation, 2 or 3 oxidizing cells in series are required. For batch operation, 1 cell is filled about two-thirds full and treated with diffused air introduced at the bottom and sulphur dioxide gas introduced just above the air; the ammonia required to maintain the solution at the proper pH value being introduced at any point, preferably at the top. With sufficient air and sulphur dioxide fed at a proper rate, namely, so that a minimum of the latter gas escapes, it requires 6 to 8 hours to oxidize a batch of solution, irrespective of the quantity involved.

Precipitation of the iron is effected as follows:

Into the precipitating tanks 5 or 5—A, I introduce sufficient ammonia from storage tank 3 to precipitate all of the iron. The valves on the line connecting the precipitating tank 5 or 5—A to the oxidizing tanks 4 or 4—A are then opened and the motor which operates the stirring device in tank 5 or 5—A is started. As soon as all of the oxidized liquor has flowed into the precipitating tank, I take the temperature of the mixture and adjust it, if necessary, to 70° C., by the admission of steam or by direct application of heat to the shell of the vessel. By maintaining the temperature of the mixture at 70° C. and continuing the stirring for a period of from 30 minutes to 1 hour, the desired transformation in the precipitate is effected, after which it is allowed to settle. The precipitate is then separated from the liquid by filtering. The clear solution is then evaporated and treated to recover the soluble sulphate by the usual conventional methods.

Having described the principles and operation of my process, using the known method of oxidizing the ferrous sulphate with sulphur dioxide and air, I desire to describe how to apply my fourth discovery, namely, that solutions of sulphites, particularly ammonium sulphite, may be substituted for sulphur dioxide. This discovery is important because the solutions of the sulphites are more easily handled and controlled than the gaseous sulphur dioxide. This discovery also permits the utilization of sulphur dioxide from many sources, such as chimney gases, gases from the calcination of waste sulphur bearing materials, etc., from which the sulphur dioxide may be recovered as sulphites by scrubbing the gases with dilute ammonia or soda solutions.

Using the ammonium sulphites as an example the principles of this modification of my invention are most briefly explained by the following reactions:

With acid sulphate solutions the ammonium sulphites first react with the free acid present, thus:

9. $H_2SO_4 + (NH_4)_2SO_3 \rightarrow (NH_4)_2SO_4 + H_2O + SO_2$
10. 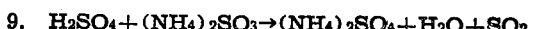
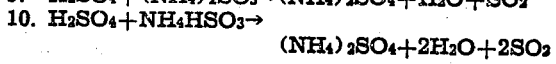

With diffused air being introduced into the solution, the sulphur dioxide thus liberated reacts with oxygen and ferrous sulphate to produce ferric sulphate in accordance with Reaction 1. In applying Reaction 9, it should be noted that a minimum of free acid in relation to the ferrous sulphate must be present, the exact proportion being given by the reaction:

11. 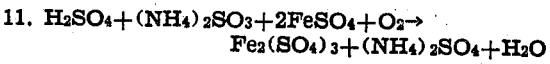

Excess free acid results in the formation of acid ammonium sulphate (as in Reaction 12), which may be fully neutralized when the iron is precipitated.

12. 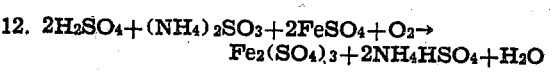

To avoid precipitation of part of the iron as a hydrated ferric oxide, neutral ferrous sulphate solutions require ammonium bisulphite in the oxidation step, this being represented by Reaction 13:

13. 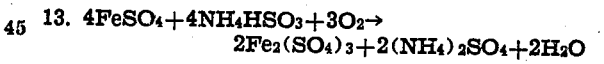

Figure 2:
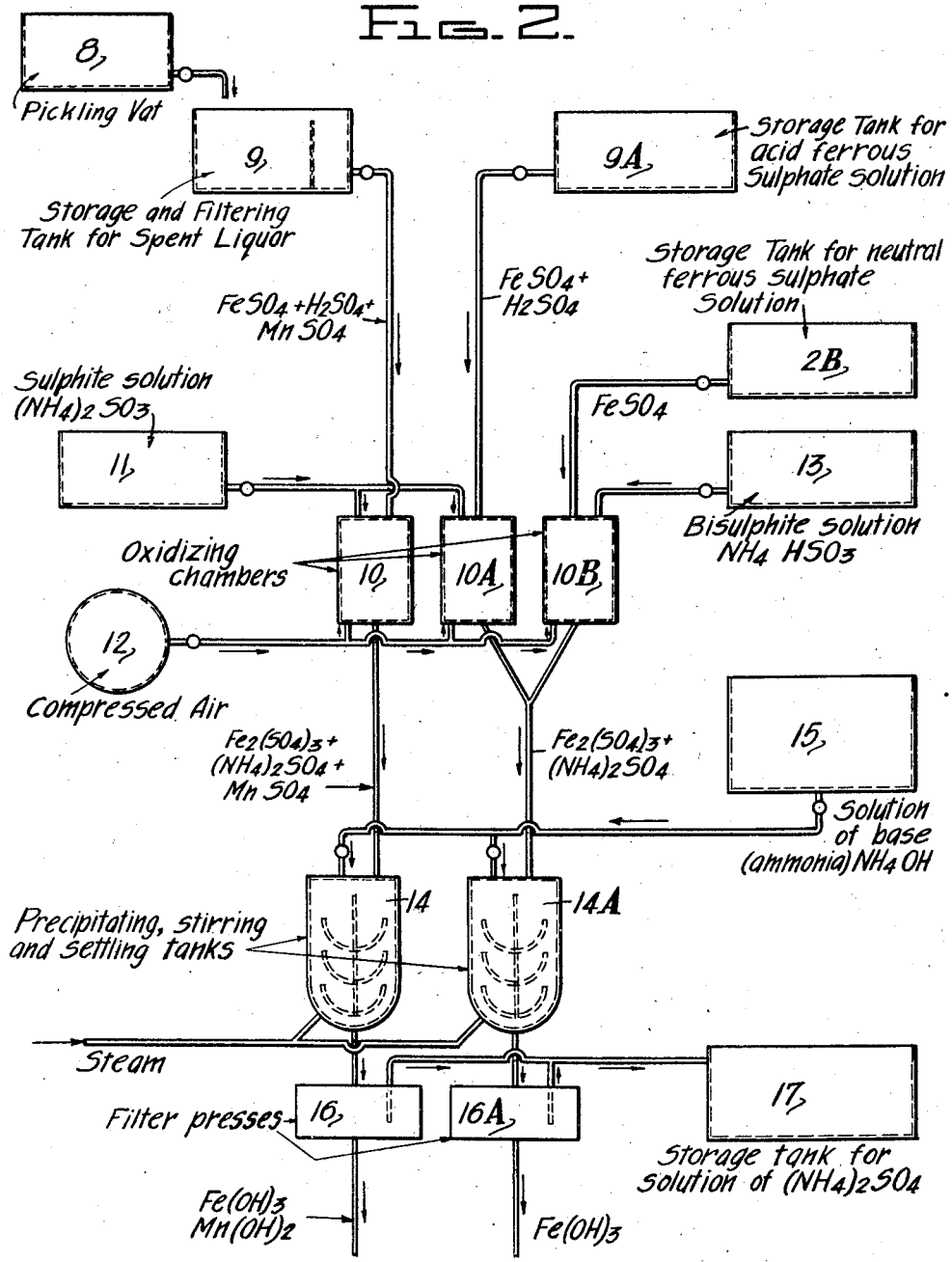
Figure 2 is a flow sheet illustrating the manner of carrying out my process with sulphites substituted for sulphur dioxide, as applied to spent pickling acid, acid ferrous sulphate solutions, and neutral ferrous sulphate solutions.

A comparison of the flow sheet of Figure 2 with that of Figure 1 shows the points of difference between the use of sulphur dioxide and sulphites, for the purpose of oxidizing the ferrous sulphate.

In Figure 2, it will be observed that the acid ferrous sulphate solutions are not neutralized as an initial step. Hence, spent pickling acid delivered from vat 8 to tank 9 is merely cleared of insoluble foreign matter in this tank 9. Then the acid ferrous sulphate solution from either tank 9 or 9—A is allowed to flow into the oxidizing cells, all of this equipment being constructed of acidproof materials. In the oxidizing tanks the air is introduced through diffuser tubes at the bottom of the tanks, and the sulphite solutions from tanks 11 and 13 are introduced about 10 inches above the top surfaces of the diffuser tubes. These sulphite solutions are fed in gradually, the escape of sulphur dioxide with nitrogen from the diffused air being a positive indication that the solutions are being fed in too rapidly.

The remaining steps of the process are conducted exactly as already described for sulphate solutions oxidized with sulphur dioxide and air.

Having described above, the various modifications that may be made in my process to produce other sulphates from ferrous sulphate solutions, I desire to describe further how the process may be modified to produce double sulphates, particularly ferric alums, such as ferric ammonium alum, ferric potassium alum and ferric sodium alum.

From the preceding descriptions, it will be observed that the oxidized solutions represent mixtures of ammonium and ferric sulphates and, if the percent of free acid in the spent pickling acid is approximately one-third of the percent of ferrous sulphate, as it generally is, these salts are in proper proportion to form ferric ammonium alum, $$FeNH_4(SO_4)_2 + 12H_2O$$

or $$Fe_2(SO_4)_3(NH_4)_2SO_4 + 24H_2O$$

This double salt is very soluble in warm water—about 400 grams in 100 grams of water at 100° C.—but much less soluble in cold water—only about 100 grams being soluble in 100 grams of water at 20° C. Consequently, if one-third to one-half of the water originally present in the spent pickling acid is evaporated, the double salt will crystallize at room temperature. If the solution is cooled to some temperature below 10° C., from one-half to two-thirds of the double salt will crystallize without evaporative treatment. With neutral ferrous sulphate solutions oxidized with sulphur dioxide and air or bisulphides and air, the evaporation of the excess water may be effected prior to oxidizing; but where sulphites are used the evaporation is done by preheating the air that is diffused into the solution in the oxidizing cell, or preferably in a separate operation in which the solution is sprayed through preheated air contained in a wooden or a lead lined steel vessel. In either case the solution is transferred to a crystallizing tank in which it is permitted to cool and from which the crystals are removed and separated from the mother liquid by conventional means. This double salt may be used to advantage as a substitute for alum in water treating as well as for many other purposes.

If preferred, the oxidized solution may be used for the production of ammonium sulphate and ferric hydroxide or oxide. If the latter product is desired, the oxidized liquor is treated as already described for the production of ammonium sulphate.

The reactions by which I produce ferric ammonium alum in at least five modifications of the process of my invention are as follows:

*Alum from acid and neutral ferrous sulphate solutions oxidized with sulphur dioxide and air*

14. $H_2SO_4 + 2NH_4OH + 2FeSO_4 + SO_2 + O_2 \rightarrow$
$$2FeNH_4(SO_4)_2 + 2H_2O$$

According to Reaction 14, the free sulphuric acid must be nearly one-third of the ferrous sulphate, by weight, and adjustment of the free acid in the ferrous sulphate solution to give thirty parts of ferrous sulphate to nine parts of free acid to allow for the acid formed later in the oxidation step is one way by which I may successfully produce ferric ammonium alum. However, since it is possible to produce acid as shown by reaction 2, alum may be produced from any solution containing ferrous sulphate and less than one-third as much free acid. In operating my process in accordance with this second procedure with free acid or with neutral solutions of ferrous sulphate, I pass sulphur dioxide, air, and ammonia into the oxidizing chamber until, as shown by analysis, the sulphates are in correct proportions to form ferric alum. If the excess water has previously been evaporated, this point can be detected by a rapid analysis for ammonia which should be 3.5%, by weight, of the solution.

Figure 3:
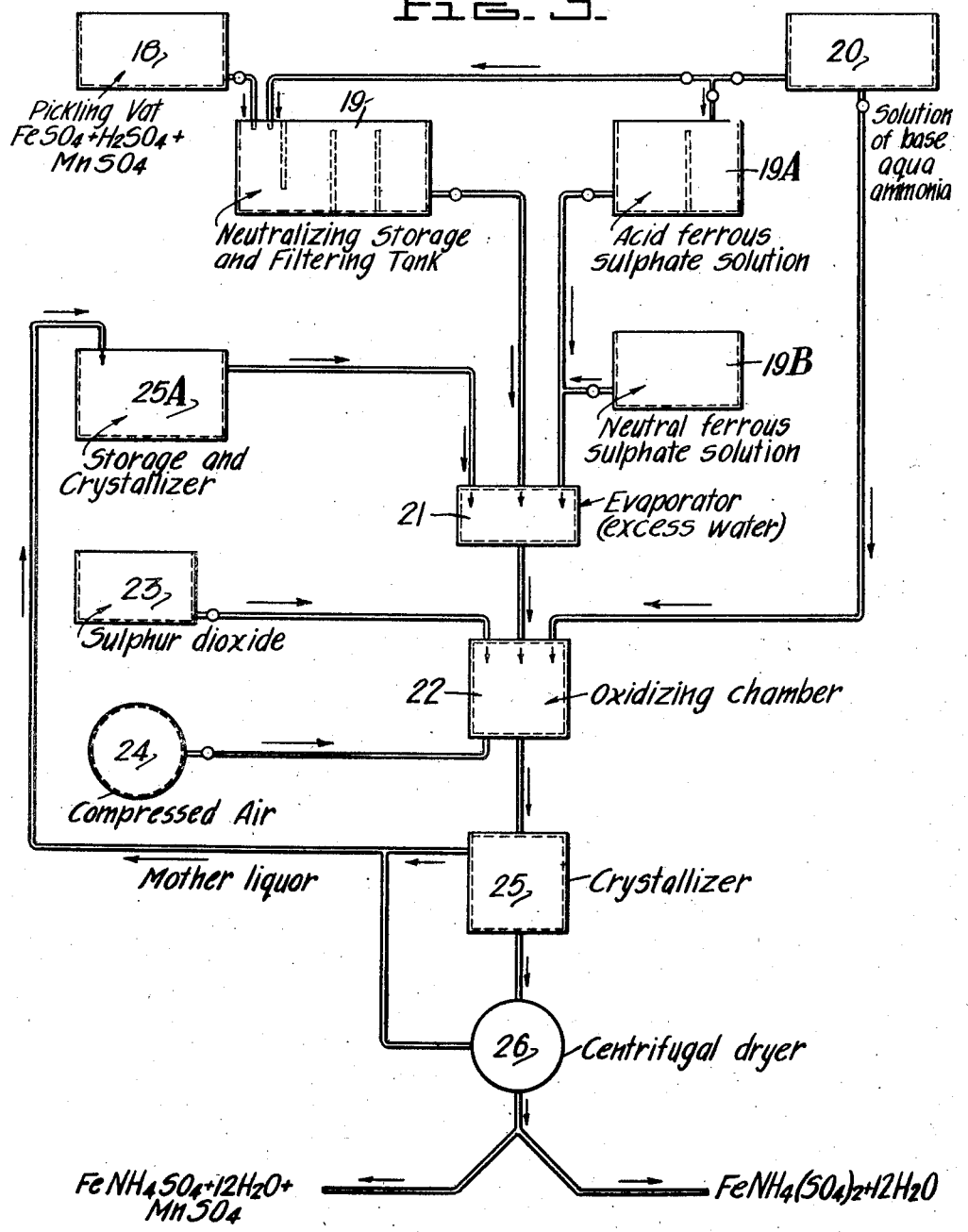
Figures 3 and 4 are flow sheets illustrating modifications to be presently described.

Referring to the drawings, this modification of the process of my invention is illustrated by Figure 3 in which 18 represents a pickling vat; 19 a combination neutralizing and filtering tank for spent pickling acid; 19A a neutralizing and storage tank as is used for other acid ferrous sulphate solutions; 19B a storage tank as is used for neutral ferrous sulphate solutions; 20 a storage tank for a supply of the solution of the base to be used, e. g., aqua ammonia; 21 evaporating equipment, preferably multiple effect; 22 a tank or chamber in which the ferrous sulphate solutions are oxidized; 23 any source of supply of sulphur dioxide gas; 24 an air compressor; 25 a cooling and crystallizing tank of conventional design; 26 a centrifugal dryer and 25A a storage and crystallizing tank supplementing 25, particularly for the processing of spent pickling acid and similar substances that may be partially or wholly purified by crystallization. In such latter solutions, the impurities concentrate in the mother liquor, and this plant layout provides for running the mother liquor through the evaporators separately if desired.

From the flow sheet, the various steps in this modification of my process are apparent, such as follows:

The acid ferrous sulphates are just neutralized with the base of the non ferrous sulphate desired and, if necessary, are freed of insoluble matter. The neutral sulphate solutions are next evaporated to leave them in solution in a quantity of water equal to that required to keep them in solution at 60° C.

As the iron is most quickly determined, I use it as an index and aim to obtain a certain number—between 10 and 14—of grains of iron per 100 c. c. of solution, the exact proportions depending upon whether or not there are impurities which it is desirable to separate by crystallization. In processing commercially pure ferrous sulphate solutions to ferric ammonium alums, the total water should be equal to the weight of the salt including the water of crystallization. The solution is then transferred to the oxidizing chamber where the ferrous sulphate is oxidized with sulphur dioxide and air, as previously described. The end point at this stage is determined by titrating a small portion for ferrous iron, as in a chemical determination of iron.

After substantially all of the iron has been oxidized, the cell is operated to produce acid as required, at the end of which period the hydrogen ion concentration of the solution is adjusted to pH-2, and the solution is transferred to a crystallizing tank. Here it is cooled to a temperature of approximately 10° C. and the crystals are separated from the mother liquor in which the impurities are found in more concentrated form. Some impurities, such as manganese sulphate, tend to crystallize with the ferric alums so that a sharp separation cannot be obtained in one crystallization, as indicated on the flow sheet.

*Alum from acid and neutral ferrous sulphate solutions, oxidized with sulphites*

Figure 4:
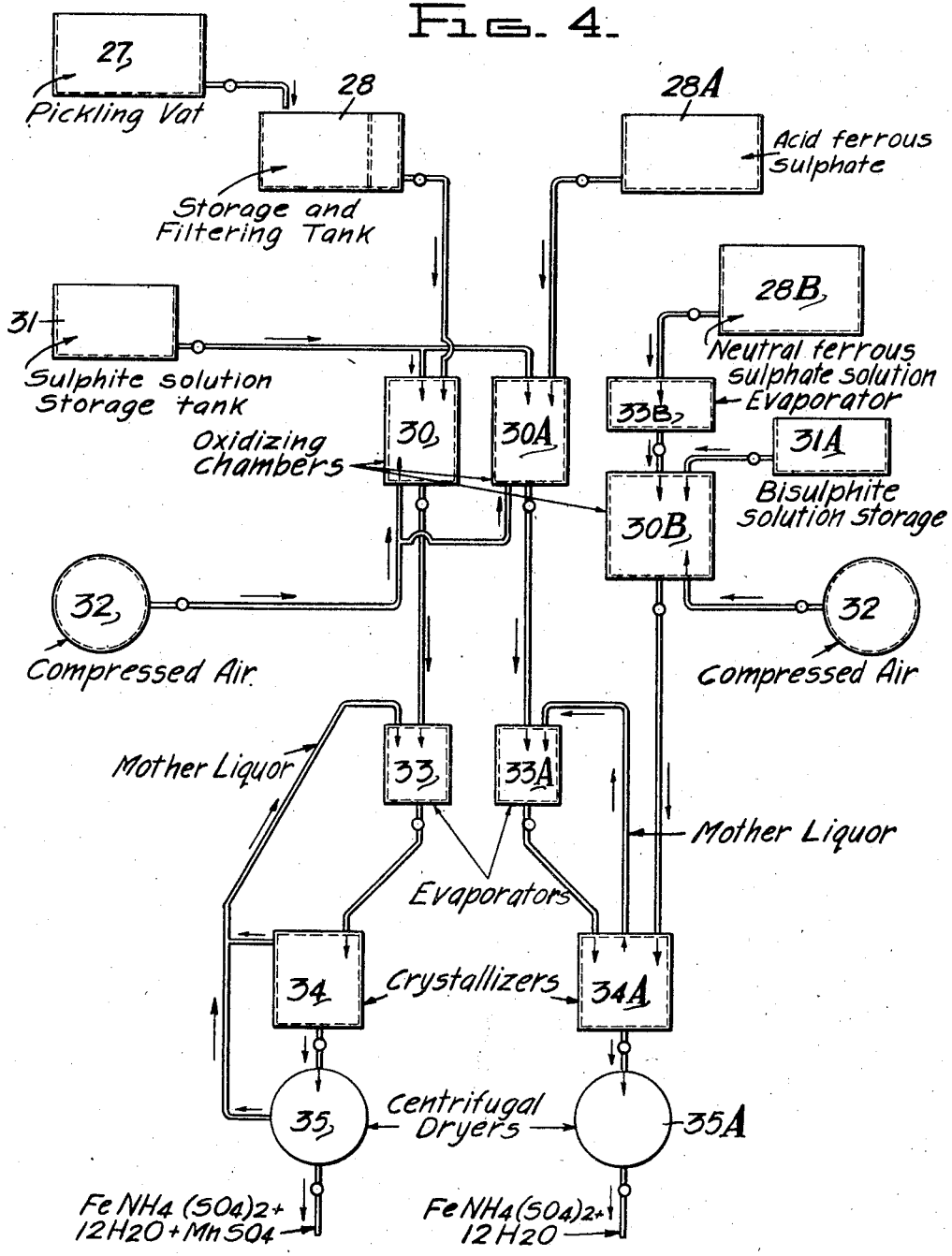

A modification of my process for using ferrous sulphate solutions for the manufacture of ferric alum in which sulphites are substituted for sulphur dioxide is shown in Figure 4, which is a flow sheet indicating the various steps for treating acid ferrous sulphate and neutral ferrous sulphates. As is apparent from this flow sheet, acid ferrous sulphate solutions are oxidized with sulphites and air while neutral ferrous sulphates are oxidized with bisulphites and air, each of these two treatments requiring a different arrangement of equipment and in one instance, namely, evaporation, different types of equipment are required. The principles of each modification are shown by the following reactions:

For acid ferrous sulphates oxidized with sulphites, for example, ammonium sulphite and air, the reaction is—

15. $H_2SO_4 + 2FeSO_4 + (NH_4)_2SO_3 + O_2 + 11H_2O \rightarrow$
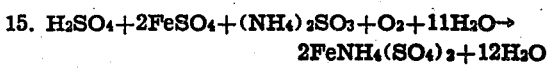
$2FeNH_4(SO_4)_2 + 12H_2O$ For neutral ferrous sulphates oxidized with bisulphites, for example, ammonium bisulphite and air, the reaction is—

16. $4FeSO_4 + 4NH_4HSO_3 + 3O_2 + 10H_2O \rightarrow$
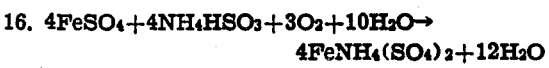
$4FeNH_4(SO_4)_2 + 12H_2O$ These reactions give, for both modifications of the process, the relations by weight of the various reagents required to form the ferric alum desired and form the basis for the control of the free acid, the quantities of sulphites or bisulphites required and the percentage of water to be left in solution prior to evaporation, which may be regulated as explained above for oxidation with sulphur dioxide and air.

The various steps in the process, as well as the modifications required to treat acid and neutral ferrous sulphate solutions are illustrated by Figure 4, which is a flow sheet giving the steps in the processing of acid ferrous sulphates (left) with sulphites and air, for example, ammonium sulphite and air, and the processing of neutral ferrous sulphate (right) with bisulphites and air. In this flow sheet, 27 represents a vat for pickling steel; 28 a storage and filtering tank to remove foreign matter from the spent pickling acid; 28A a storage tank for acid ferrous sulphate from any source, and 28B a storage tank for neutral ferrous sulphate from any source. From these tanks the acid solutions are conducted through acidproof pipes to their respective oxidation chambers, 30 and 30A, as required.

From reaction 15, it will be observed that the acid in the solution should be approximately one-third of the ferrous sulphate by weight, but I have found that solutions containing less than this proportion of acid may be used by continuing this treatment beyond the point at which all the iron is oxidized, the ammonium sulphite being oxidized to sulphate when it is conducted into the solution after this point has been passed. Therefore, I continue the treatment with diffused air, admitting the sulphite gradually until the iron is all oxidized and tests show that the iron and ammonia are in proper proportions to form ferric ammonium alum, then stop the addition of sulphite and continue the air flow until a test indicates all the sulphite has been oxidized. The oxidized solution is then permitted to flow to a spray dryer 33 and 33A, in which the water in excess of that required for crystallization is evaporated with heated air or other hot gases of an oxidizing nature. From the evaporator, the saturated solution is conducted to crystallizing tanks 34 and 34A, where the liquor is cooled and the salts permitted to crystallize. The crystals are then collected and dried in a centrifugal type dryer, while the mother liquor is returned to the dryer or collected in a special storage tank for treatment separately.

In treating neutral ferrous sulphate solutions, this procedure may be changed and the excess water evaporated in a multiple effect evaporator 33B before the solution is oxidized. After evaporation of the excess water, the solution is conducted to an oxidizing cell 30B, similar in every respect to 30 and 30A, used to oxidize acid ferrous sulphate solutions. In this chamber, diffused air is admitted at the bottom and the sulphite, for example ammonium bisulphite, is fed in gradually until all the iron is oxidized. This treatment automatically gives the salts in proper proportion to form ferric ammonium alum, as shown by reaction 16. The solution is then transferred to a crystallizer and cooled, when the salts are recovered and dried by centrifuging as described above for other modifications of the process.

This application is a continuation-in-part of prior application Serial No. 390,001, filed April 23, 1941, for Process for the utilization of ferrous sulphate solutions in the manufacture of other sulphates; and the foregoing is substantially a duplicate of the specification of this prior application.

For the purpose of oxidizing ferrous sulphate in solution, in accordance with the present process, the similarities, as well as the differences, in the reactions obtained with $SO_2$ and air, $H_2SO_3$ and air, or sulphites, such as ammonium sulphites, and air, are briefly and simply explained as follows:

First, it is noted that the oxidation of ferrous sulphate to $Fe_2(SO_4)_3$ amounts to changing the valence of iron from 2 to 3 and that this change may be effected in two ways, namely, by combining three molecules of ferrous sulphate and removing one atom of iron from the group, as in Reaction 2 below, or by combining two molecules of the salt and adding one $SO_4$ radical as in Reaction 3:

2. $6FeSO_4 + 3O + 3H_2O = 2Fe_2(SO_4)_3 + 2Fe(OH)_3$

3. $2FeSO_4 + H_2SO_3 + 2O = Fe_2(SO_4)_3 + H_2O$

According to the prior art, Reaction 3 above is represented by Reaction 3—a below, which is also the reaction employed in the present process, and set forth in the specification to show the relation of the present invention to the prior art, it being understood that a disclosure is not necessarily a scientific exposition.

3—a. $2FeSO_4 + SO_2 + O_2 = Fe_2(SO_4)_3$

Either of these reactions may be used to oxidize ferrous sulphate, but since it is desired in the present invention to avoid the formation of a precipitate as a product of the oxidation, applicant employs the second Reaction 3 above, substituting sulphites, specifically ammonium sulphite or bisulphite, for the sulphurous acid. Incidentally, these reactions express one of the fundamental differences between the present process and the processes of the prior art.

Comparing the action of these sulphites with that of sulphurous acid, it is noted that all three of these ionize as follows:

4. $H_2SO_3 \rightarrow \overset{+}{H} + \overset{+}{H} + \overset{--}{SO_3}$

5. $NH_4HSO_3 \rightarrow \overset{+}{H} + \overset{+}{NH_4} + \overset{--}{SO_3}$ 6. $(NH_4)_2SO_3 \rightarrow \overset{+}{NH_4} + \overset{+}{NH_4} + \overset{--}{SO_3}$ From these ionization reactions, it is apparent that the active agent in the oxidation of ferrous sulphate, in accordance with Reactions 3 and 3—a is SO₃, which must first be oxidized to SO₄ by taking oxygen from the air used, a reaction which is catalyzed by ferric sulphate, manganic sulphate, vanadic sulphate, and possibly other sulphates of the heavy metals. It is, therefore, the free nascent SO₄ radical which is capable of uniting, and does so unite, with two molecules of ferrous sulphate to form ferric sulphate.

But, whereas the fundamental chemical principle underlying the oxidation of ferrous sulphate by sulphurous acid and by the sulphites, both acting in conjunction with atmospheric oxygen, is the same, all three of the former reagents present certain differences that are important in the practice of the process of the present invention, which differences may be listed briefly as follows:

1. The oxidation of acid solutions of ferrous sulphate with sulphurous acid and air progresses slowly or not at all if the acidity is high, and in the oxidation of neutral solutions (pH₂ to pH₄) some sulphuric acid is formed as the ferrous sulphate is oxidized.

2. With ammonium sulphite, or bisulphite, highly acid solutions of ferrous sulphate may be oxidized, because the sulphite first reacts with the free acid, liberating sulphurous acid and forming ammonium sulphate by one of the following reactions:

7. $2H_2SO_4+(NH_4)_2SO_3 \rightarrow 2NH_4HSO_4+H_2SO_3$
8. $H_2SO_4+2(NH_4)SO_3 \rightarrow (NH_4)_2SO_4+H_2SO_3$
9. $H_2SO_4+NH_4HSO_3 \rightarrow NH_4HSO_4+H_2SO_3$
10. $H_2SO_4+2NH_4HSO_3 \rightarrow (NH_4)_2SO_4+2H_2SO_3$ In these reactions, the amount of free acid present determines whether acid or neutral ammonium sulphate is formed.

3. With neutral ferrous sulphate solutions, that is, solutions of pH₄ to pH₅, ammonium sulphite precipitates some iron as ferric hydrate, while ammonium bisulphate gives no precipitate. Although the ferric hydrate may be dissolved, applicant prefers to prevent its forming in order to avoid danger of forming an almost insoluble basic ferric sulphate. The reactions representing the oxidation of acid and neutral ferrous sulphate solution with ammonium sulphite and bisulphite are given on column 11.

4. After all the ferrous sulphate has been oxidized in a given batch of solution with ammonium sulphite, applicant in the operation of his process may continue the feeding of the latter and of diffused air to control the amount of ammonium sulphate formed in relation to the quantity of free acid and ferrous sulphate originally present, because the sulphite itself is then oxidized to ammonium sulphate thus:

11. $2(NH_4)_2SO_3+O_2 \rightarrow 2(NH_4)_2SO_4$

5. The substitution of the ammonium sulphites for sulphur dioxide has other outstanding advantages also. For example, the burning of pyrites or other sulphur-bearing compounds, and even sulphur itself, presents difficulties in that the mixtures of SO₂ and air are very corrosive, the gases are laden with dust that clogs diffusers, and obviously all parts of a plant must operate in unison.

By the present process all of these difficulties are overcome, for there must be absorbed the SO₂ from the products of combustion of the sulphur-bearing compounds with dilute solutions of ammonia which may be built up to any concentration desired, because the ammonium sulphites are very soluble in water. These solutions may be prepared, stored, and used as required, independent of the production and oxidation of ferrous sulphate. Use of ammonia in this way to obtain the ammonium sulphites also increases the sources of sulphur dioxide from which applicant may draw to operate his process, because he may thus use ammonia to remove the sulphur dioxide from stack gases produced in furnaces burning coal or other high sulphur fuels. Dusts collected by the sulphite solutions do not interfere seriously in the present process because they are separated easily from the solution and, if not separated, they will not clog the apparatus employed, since applicant feeds these solutions to his oxidizing chambers through tubes with relatively large openings.

It may be mentioned in this connection that the present process opens up the possibility of using ammonia for removing sulphur dioxide from stack gases, since the present process opens up an important source of disposal of the sulphite liquors, the disposal of which heretofore presented a difficult problem.

It may be noted in this connection regarding the term base or bases as employed in the following claims that a base, in general, is a substance which is capable of decreasing the hydrogen ion concentration of solutions as distinguished from acids which increase the hydrogen ion concentration. Bases that form soluble sulphites and also are capable of precipitating ferric ions are the hydroxides and carbonates of ammonium, lithium, sodium, potassium, magnesium, zinc, and nickel.

Having described in detail the various modifications that may be made in the process of my invention, I desire to add that numerous minor changes may be made in the procedure of carrying out the process without exceeding the scope of the invention as defined by the following claims.

I claim:

1. A process for the manufacture of commercially pure ammonium sulphate and ferric hydroxide from spent sulphuric acid solutions produced in sulphuric acid pickling of ferrous metal, the said solutions containing ferrous sulphate and free sulphuric acid, and from crude coke-works ammonia derived from destructive distillation of bituminous coal, which process comprises oxidizing the said spent solution by treating the ferrous sulphate solutions simultaneously with sulphur dioxide and diffused air while maintaining the solution at atmospheric pressure at a temperature of between approximately 45° C. and approximately 70° C. and while maintaining the solution at a pH value of from pH-1 to pH-2 by gradual additions of the said crude ammonia, adding to the resulting oxidized solution sufficient of the ammonia to precipitate the iron as ferric hydroxide and to adjust the pH value of the solution to between pH-4 and pH-11, adjusting the temperature of the solution to approximately 70° C., agitating the resulting mixture of precipitate and liquor while maintaining the temperature constant until the ferric hydroxide precipitate transforms from a gelatinous flocculent condition to a granular form that settles rapidly and filters readily from the solution, filtering the resulting modified precipitate from the solution, and recovering commercially pure ammonium sulphate from the said solution.

2. The process as claimed in claim 1 wherein the sulphur dioxide employed is introduced into the solution as sulphur dioxide gas from a source external to the solution.

3. A method for obtaining readily filterable precipitate of ferric hydroxide precipitates produced from ferric sulphate solutions which method comprises adding a base that will form a soluble sulphate to a given quantity of the ferric sulphate solution until sufficient of the base has been added to precipitate substantially all of the iron present in the ferric sulphate solution, adjusting the hydrogen ion concentration of the solution to between pH-6 and pH-11 and the temperature of the liquid and precipitate to between 60° C. and 75° C. and agitating the mixture maintained within this temperature range until the precipitate has transformed to a granular form that settles rapidly and may be separated readily by conventional methods.

4. A process for the manufacture of commercially pure ammonium sulphate and ferric hydroxide from spent sulphuric acid solutions produced in sulphuric acid pickling of ferrous metal, the said solutions containing ferrous sulphate and free sulphuric acid, and from coke works ammonia derived from the destructive distillation of bituminous coal, which process comprises adding to the spent solution an ammonium salt of sulphurous acid in quantities favoring production of substantial amounts of sulphur dioxide in the said solution from the action of the free sulphuric acid on the said ammonium salt of sulphurous acid, oxidizing the said spent solution with diffused air during liberation of the said sulphur dioxide while maintaining the solution at approximately atmospheric pressure and at a temperature of between approximately 45° C. and approximately 70° C., and while maintaining the solution at a pH value of from pH-1 to pH-2 by the gradual additions of the said crude ammonia, adding to the resulting oxidized solution sufficient of the ammonia to precipitate the iron as ferric hydroxide and to adjust the pH value of the solution to between pH-4 and pH-11, adjusting the temperature of the solution to approximately 70° C., agitating the resulting mixture of precipitate and liquor while maintaining the temperature constant until the ferric hydroxide precipitate transforms from a gelatinous flocculent condition to a granular form that settles rapidly and filters readily from the solution, filtering the resulting modified precipitate from the solution, and recovering commercially pure ammonium sulphate from the said solution.

5. The process as claimed in claim 4, wherein the ammonium salt of sulphurous acid is ammonium sulphite.

6. The process as claimed in claim 4, wherein the ammonium salt of sulphurous acid is ammonium bisulphite.

7. A method of making ferric hydroxide and ammonium sulphate from ferrous sulphate solutions, which comprises introducing air and a reagent selected from the group consisting of sulphur dioxide, ammonium sulphite, and ammonium bisulphite, into a body of ferrous sulphate solution maintained at a temperature between 45° C. and 70° C. until the hydrogen ion concentration of the solution reaches a value between pH-1 and pH-2, continuing the oxidation while adding sufficient ammonia to maintain the pH in this range until all ferrous iron is oxidized to the ferric state, then adding sufficient ammonia to precipitate the iron as ferric hydroxide, separating the ferric hydroxide precipitate from the solution, and recovering ammonium sulphate from the solution.

CHARLES B. FRANCIS.

REFERENCES CITED

The following references are of record in the file of this patent:

UNITED STATES PATENTS

| Number | Name | Date |
|---|---|---|
| Re. 21,215 | Keyes | Sept. 26, 1939 |
| 1,477,965 | Leaver | Dec. 18, 1923 |
| 2,021,936 | Johnstone | Nov. 26, 1935 |
| 1,824,936 | Travers | Sept. 29, 1931 |
| 868,385 | Wullfing | Oct. 15, 1907 |
| 708,585 | Ramage | Sept. 9, 1902 |
| 1,550,521 | DuFaur | Aug. 18, 1925 |

OTHER REFERENCES

Hinds "Inorganic Chemistry," 2d edition, page 285. (Copy in Div. 59.)

"Hydrogen Ions," by Britton, page 48. Copy in Division 59.)